United States Patent [19]
Uraki et al.

[11] Patent Number: 5,972,087
[45] Date of Patent: Oct. 26, 1999

[54] WATER-BASED INK-JET RECORDING FLUID

[75] Inventors: Hisashi Uraki; Ichiro Toyoda; Shigeyuki Ehashi; Seiji Aida; Yasuharu Iida; Seiji Sawada; Akio Sato, all of Tokyo, Japan

[73] Assignee: Toyo Ink Manufacturing Co., Ltd., Tokyo, Japan

[21] Appl. No.: 08/945,267

[22] PCT Filed: Feb. 26, 1997

[86] PCT No.: PCT/JP97/00548

§ 371 Date: Oct. 24, 1997

§ 102(e) Date: Oct. 24, 1997

[87] PCT Pub. No.: WO97/31072

PCT Pub. Date: Aug. 28, 1997

[30] Foreign Application Priority Data

Feb. 26, 1996 [JP] Japan ................................ 8-037652
Aug. 26, 1996 [JP] Japan ................................ 8-223338

[51] Int. Cl.⁶ .................................................. C09D 11/02
[52] U.S. Cl. ...................... 106/31.65; 106/31.86; 106/31.89
[58] Field of Search ............................. 106/31.65, 31.86, 106/31.89

[56] References Cited

U.S. PATENT DOCUMENTS 5,221,332   6/1993   Kohlmeier ..................... 106/31.58

FOREIGN PATENT DOCUMENTS

59/199780   11/1984   Japan .
05/117562    5/1993   Japan .
08/319442   12/1996   Japan .
08/325498   12/1996   Japan .

OTHER PUBLICATIONS

Dialog abstract of JP59/199780, Nov. 1984.

CA abstract of JP59/199780, Nov. 1984.

*Primary Examiner*—Helene Klemanski
*Attorney, Agent, or Firm*—Oblon, Spivak, McClelland, Maier & Neustadt, P.C.

[57] ABSTRACT

By use of recording liquid for water based inkjet with pigment and colloidal silica, it is possible to obtain prints print recorded on plain paper with good clearness and high quality and image of the print recorded material with sufficient water resistance and light resistance.

9 Claims, No Drawings

WATER-BASED INK-JET RECORDING FLUID

TECHNICAL FIELD

The present invention is related to recording liquid for use in water based inkjet. In particular, it is related to a recording liquid for water based inkjet which records on plain paper such as acid paper, neutral paper, etc. used commonly in offices etc., with high color saturation and high water-resistance of the print recorded material.

BACKGROUND ART

As disclosed in Japanese patent application laid-open No. 53-61412, Japanese patent application laid-open No. 54-89811 and Japanese patent application laid-open No. 55-65269, up to now water soluble dye such as acid dye, direct dye, basic dye, etc. dissolved in glycolic solvent and water has been widely used for the inkjet recording liquid. However, since water soluble dyes with high solubility in water are generally used to ensure stability of the recording liquid, the water resistance of the inkjet recorded materials is generally low and the dye on the recorded material may be easily smudged when water is spilled onto it.

As disclosed in Japanese patent application laid-open No. 56-57862 attempts have been made to improve the inferior water resistance by changing the structure of the dye or preparing recording liquid with high basicity. Also, as disclosed in Japanese patent application laid-open No. 50-49004, Japanese patent application laid-open No. 57-36692 and Japanese patent application laid-open No. 59-20696 and Japanese patent application laid-open No. 59-146889, attempts to improve water resistance by apt use of the reaction between the recording paper and recording liquid have been made.

These methods have made remarkable effects for special recording papers but lack versatility in that they are limited to special recording papers and, quite often, the water-resistant quality of the recorded material is insufficient when recording papers other than those specially prescribed are used.

Oil soluble dye dispersed or dissolved in high boiling point solvents and oil soluble dye dissolved in volatile solvents are also recording liquids with good water resistance but are environmentally unpreferable due to the bad odor and exhaust of the solvents. Also problems such as solvent recovery will be required depending on the location where the apparatus is installed and a large amount of recording is executed.

Therefore, in order to improve the water resistance of the printed material, pigment dispersion type recording liquid where the pigment is dispersed in an aqueous medium is under development.

However, whereas the water resistance of the recorded material has improved by changing the colorant from dye to pigment and finely graining the pigment, it has met with a problem of the inability in obtaining a clear image of recorded materials when printed on plain paper such as acid paper, neutral paper generally used in offices.

This is considered to be due to the fact that when a dye type recording liquid is used, the dye dyes the paper fiber and produces clear image whereas when pigment dispersed type recording liquid is used, the pigments are embedded in between the fibers and cannot conceal the background color of the recording paper. The problem that the clearness of recorded image is impaired has become increasingly prominent with more finely graining the pigment.

In order to improve the affinity of pigments to the recording paper fiber of plain paper, etc., there is a method where aqueous resin is added to the recording liquid to fix the pigments onto the fibers. However, as the addition of aqueous resin sufficient to fix the pigments on the fibers increases the viscosity of the recording liquid, problems in practicality of ink discharge stability arise due to the increase in energy required for ink discharge of the inkjet.

DISCLOSURE OF THE INVENTION

The object of the present invention is to provide recording liquid for water based inkjet which enables prints with good clearness and high quality when used on plain paper such as acid paper, neutral paper, etc. generally used in offices, etc. and has sufficient water resistance and light resistance. That is, the present invention provides recording liquid for water based inkjet which is characterized by the inclusion of pigment and colloidal silica.

Also, the present invention provides said water based inkjet which is characterized by the inclusion of a chelating agent.

Moreover, the present invention provides said recording liquid for water based inkjet which is characterized by the inclusion of 0.1–10 wt. % pigment, 0.5–30 wt. %. colloidal silica and 0.1–5 wt. % chelating agent.

Furthermore, the present invention provides said recording liquid for water based inkjet which is characterized by the colloidal silica particles having an average particle diameter of 5–100 nm.

Also, the present invention provides said recording liquid for water based inkjet which is characterized by the pigment selected from the group consisting of quinacridone type, phthalocyanine type, azo type, isoindolinone type, quinophthalone type, dianthraquinone red type, throne type, perylene type and carbon black type.

Moreover, the present invention provides said recording liquid for water based inkjet which is characterized by inclusion of anionic surfactant or non-ionic surfactant.

Furthermore, the present invention provides said recording liquid for water based inkjet which is characterized by the pH being 6–10.

The reason why the recorded material obtained by the use of the recording liquid of the present invention has superior transparency and clearness is not clear but may be inferred as follows.

In general, the pH of the surface of plain papers used widely as a recording material ranges from acid to neutral. Compatibility of the pigment and colloidal silica contained in the recording liquid for water based inkjet of the present invention is good as gelation and separation do not occur due to the electrical repulsion between them. However, when the recording liquid is applied to print on a recording medium, unbalance sets in the dispersed state of the recording liquid and membrane forming takes place rapidly with the evaporation of the volatile components and the change in the pH of recording liquid, leading to formation of a bound state between the components in the residual recording liquid on the recording material and the components of the recording material. The pigment, which is the colorant, participates in part of this bound state and is trapped in the network structure. This membrane forming keeps the pigment from falling in between the paper fibers enabling it to cover up the color of the recording paper foundation and to maintain the clearness of the recorded material.

In accordance with the present invention, a recording liquid for water based inkjet is provided which, when print recorded on plain paper such as acid paper, neutral paper commonly used in offices, etc., yields high quality print recorded materials with excellent transparency and clearness, and sufficient water resistance and light resistance.

BEST MODE FOR CARRYING OUT THE INVENTION

As long as it is insoluble in water, there is no particular restriction to the pigment used in the present invention. Dispersed dye, oil-soluble water-insoluble dye, direct dye, acid dye or basic dye made water insoluble by laking may be used as the water insoluble dye. Dyes which dissolve completely into the synthetic resin used, however, are excluded from the present invention.

For the pigment, insoluble azo pigments such as toluidene red, toluidene maroon, hansa yellow, benzidene yellow, pyrzolone red, etc., and soluble azo pigments such as litholred, heliobordeaux, pigment scarlet, permanent red 2B, etc., and pigments derived from vat dye such as alizarine, indanthrene, thioindigo maroon, etc., and phthalocyanine type pigments such as phthalocyanine blue, phthalocyanine green, etc., and quinacridone type pigments such as quinacridone red, quinacridone magenta, etc., and perylene type pigments such as perylene red, perylene scarlet, etc., and isoindolinone type pigments such as isoindolinone yellow, isoindolinone orange., etc., and dianthraquinolyl red, quinophthalone, carbon black and pigments synthesized newly for the present invention may be used.

Also the color index (C.I.) number of the pigments are, for example, C.I. pigment yellow 12, 13, 14, 17, 20, 24, 74, 83, 86, 93, 109, 110, 117, 125, 137, 138, 147, 148, 153, 154, 166, 168, C.I. pigment orange 13, 16, 36, 43, 51, 55, 59, 61, C.I. pigment red 9, 48, 49, 52, 53, 57, 97, 122, 123, 149, 168, 177, 180, 192, 215, 216, 217, 220, 223, 224, 226, 227, 228, 238, 240, 254, C.I. pigment violet 19, 23, 29, 30, 37, 40, 50, C.I. pigment blue 15, 15:1, 15:4, 15:6, 22, 60, 64, C.I. pigment green 7, 36, C.I. pigment brown 23, 25, 26.

The dispersed particle diameter and the primary particle diameter of the pigment measured by laser scattering or electron microscope are preferably on the average smaller than 1.0 $\mu$m, more preferably smaller than 0.2 $\mu$m. Particle diameters as such facilitate the filtration process and the sedimentation in the recording liquid with passage of time is diminished. In the case that the dispersed particle diameter and primary particle diameter are larger than 0.2 $\mu$m, the pigment may be salt milled (a process by which the primary particle diameter of the pigment is reduced to fine size grained mechanically using inorganic salt as the milling agent). Alternatively, surface treatment of the pigment to which a functional group has been added may be made.

The colloidal silica in the present invention is a silica which has a colloidal particle size of 1–100 nm and may normally be supplied in a stable state in aqueous liquids. The aqueous dispersion of colloidal silica is a colloid of ultrafine particles of silicic acid anhydride where negative ions such as silanol group and hydroxyl group exist on the particle surface. The dispersion is stabilized with sodium hydroxide.

It is preferable that the average particle diameter of colloidal silica is 5–100 nm. More preferably, the particle diameter fine and distributed uniformly with particle size of 50–60 nm.

A combination of colloidal silica with more than two different particle sizes may be used. The pH may also be regulated appropriately by adding basic or acid components.

Some examples of colloidal silica available on the market are "Snowtex" by Nissan Chemical Industries Ltd., "Rudoxe" by DuPont Co., Ltd., "Cataloid" by Catalysis Chemical Co., Ltd., "Aderight" by Asahi Denka Kogyo K.K.

The weight percentage of colloidal silica in the recording liquid composition is 0.5–30 wt. %, more preferably 1–5 wt. %. Ink with good clearness cannot be obtained when this amount is small, whereas for large amounts, ink with good storage stability and discharge stability cannot be obtained.

The chelating agent of the present invention forms a chelate ring by reacting with metal ions. Rings are formed by creation of covalent bonds or coordinate bonds or by creation of both types of bonds. As the chelating agent has the effect of capturing metallic ions, metallic ion is captured to the surface of colloidal silica. Colloidal silica attains a metastable state by this effect and condenses on the surface of the paper and, due to the resulting decrease in the occurrence of pigment particles being embedded in between the paper fibers, the clearness is improved. Without inclusion of the chelating agent, however, the clearness deteriorates if the recording liquid is made alkaline so as to prevent the head of inkjet printer from erosion.

For instance, malonic acid, oxalic acid, phthalic acid, glycolic acid, and salicylic acid are examples of chelating agents with a ligand containing two acid groups. For instance, 8-quinolinol, acetylacetone, trifluoroacetone, dimethylglyoxime, dithizone, and salicylaldehyde are examples of ligands containing one acid group and one non-acid coordinate group. For instance, ethylenediamine, 2,2'-bipyridine, 1,10-phenanthroline, are examples of ligands with two non-acid coordinate groups. Examples of aminopolycarboxylic acid are ethylenediaminetetraacetic acid, propylenediaminetetraacetic acid, butylenediaminetetraacetic acid, pentylenediaminetetraacetic acid, cyclohexanediaminetetraacetic acid, diethylenetriaminepentaacetic acid, ethylenediaminediacetic acid, ethylenediaminemonoacetic acid, ethylenediaminetetraacetic acid, dioxaoctadiaminetetraacetic acid, hydroxyethylethylenediaminetriacetic acid, hydroxyethyliminodiacetic acid, iminodiacetic acid, nitrilotriacetic acid, triethylenetetraminehexaacetic acid, and sodium salts or ammonium salts of these compounds.

The weight percentage of the chelating agent by weight of the recording liquid for inkjet is 0.01–5 wt. %., more preferably 0.1–1 wt. %. Ink with good clearness cannot be obtained when the amount of the chelating agent is less than the lower limit and good storage stability and discharge stability cannot be obtained when it is larger than the upper limit. There is no need to use a surfactant as a dispersing agent if the pigment contained in the recording liquid for inkjet exists stably in the aqueous medium in a dispersed state without precipitating but it is preferable to use an anionic surfactant or a non-ionic surfactant to achieve, in particular, good transparency, clearness and dispersion stability.

The co-stability of the pigment and colloidal silica is maintained when an anionic surfactant or a non-ionic surfactant is used. As the surface potential of colloidal silica is negative, the colloidal silica will aggregate if the dispersing agent, which stabilizes the pigment, is positively charged.

Examples of anionic surfactants are fatty acid salt, alkylsulfuric ester, alkylarylsulfonate, alkylnaphthalenesulfonate, alkylsulfonate, dialkylsulfosuccinate, alkyldiaryletherdisulfonate, alkylphosphate, polyoxyethylenealkylethersulfate, polyoxyethylenealkylarylethersulfate, naphthalenesulfonic acid formaldehyde condensation, polyoxyethylenealkylphosphate, glycerolborate fatty acid ester, and polyoxyethylene glycerol fatty acid ester.

Examples of non-ionic surfactants are polyoxyethylenealkylether, polyoxyethylenealkylarylether, polyoxyethylene-oxypropylene block copolymer, sorbitan fatty acid ester, polyoxyethylene sorbitan fatty acid ester, polyoxyethylene sorbitol fatty acid ester, glycerol fatty acid ester, polyoxyethylene fatty acid ester, polyoxyethylenealkylamine, and a surfactant of fluoro type or silicic type.

The quantity of the surfactant is not particularly limited but, in general, 0.1–15 wt. %. Or 0.1–10 wt. %. of the total weight of the recording liquid is the preferred range.

Combined use of more than two different surfactants is allowable if circumstances require.

In order to obtain good dispersion stability and print recording characteristics, it is preferable to make the recording liquid weakly alkaline with pH of 6–10, more preferably 7–9. When the pH is lower than 6, the stability of the recording liquid deteriorates giving rise to aggregation or gelation with passage of time. On the other hand, pH in excess of 10 is unpreferable giving rise to deterioration of the stability of colloidal silica.

Also, in order to obtain good print recording characteristics, it is preferable to adjust the pH to the desired value after pre-adjusting the pH of colloidal silica to the desired value between 6–10. Amine, inorganic salt, ammonia, phosphoric acid, acetic acid, etc. may be used to adjust the pH of the recording liquid. It is preferable to include aqueous resin in the recording liquid of the present invention for good fixation of the pigment. Aqueous resin is a resin which dissolves or disperses in water and can be used singly or as a combination.

For the aqueous resin, resin of the types which dissolve or disperse in water such as acrylic, styrene-acrylic, polyester, polyamide, polyurethane types may be used.

It is preferable to use the aqueous resin in the range 0.5–10 wt. %., or more preferably in the range 1–5 wt. %. of the recording liquid. The pigment will not be sufficiently fixed when the content is smaller than 0.5 wt. % and the discharge stability may deteriorate when it is over 10 wt. %.

The viscosity of the recording liquid tends to become high when water soluble resin is used as the aqueous resin. On the other hand, the viscosity may be kept low and the water resistance of the recorded material may be improved when water dispersive resin.

Appropriately prepared neutralization agents such as ammonia, amine, inorganic alkali etc. may be added to the aqueous resin but it is preferable also in this case to regulate the pH within the desired range of 6–10.

The recording liquid for water based inkjet according to the present invention may use, as the medium, water as well as an aqueous solvent which may be utilized as the need arises. As water, ion-exchanged water or distilled water free from metal ions may be used.

Water-soluble solvents prevent desiccation of the recording liquid at the nozzle and solidification of the recording liquid and may be used singly or as a mixture in the range 1–50 wt. %. of the recording liquid to maintain stable discharge of the recording liquid and prevent drying up of the nozzle with passage of time.

Examples of such water-soluble solvents are ethylene glycol, diethylene glycol, propylene glycol, triethylene glycol, polyethylene glycol, glycerol, tetraethylene glycol, dipropyleneglycol, ketone alcohol, diethylene glycol monobutylether, ethylene glycol monobutylether, ethylene glycol monoethylether, 1,2-hexandiole, N-methyl-2-pyrrolidone, substituted pyrrolidone, 2,4,6-hexantriol, tetrafurfuryl alcohol, 4-methoxy-4 methylpentanone, etc.

Alcohol such as methanol, ethanol, isopropyl alcohol, etc. may also be used to promote drying of the recording liquid on paper.

When the medium to which the recording liquid is applied for printing the recording liquid is a permeative material such as paper, penetrants which promote permeation of the recording ink into the paper may be added to enhance apparent drying property of the recording liquid. For penetrants, glycol ether such as diethyleneglycolmonobutylether which is already given as an example of the water-soluble solvent, alkylene glycol, polyethylene glycol monolauryl ether, sodium lauryl sulfate, sodium dodecylbenzenesulfonate, sodium oleate, sodium dioctylsulfosuccininate, etc. may be used.

In order to prevent mold creation, antimold may be added within the range 0.05–1.0 wt. % to the recording liquid of the present invention. Dihydro sodium acetate, sodium benzoate, sodium pyridinethione-1-oxide, zinc pyridinethione-1-oxide, amine salt of 1,2-benzisothiazoline-3-one and 1-benzisothiazoline-3-one, may be used as antimolds.

Antifoaming agents may also be added to prevent formation of bubbles in the recording liquid during circulation and migration of the recording liquid or during recording liquid production.

Furthermore, dyes may be used, taking care that no problems arise in water-resistance and light-resistance qualities, to adjust the hue, add density, so on. As the use of dyes may deteriorate the dispersion stability of the pigment, it is preferable to restrict its use to below 40 wt. % or, more preferably, to below 25 wt. % of the pigment. Dispersed dye, oil soluble, water insoluble dye, direct dye, acid dye, reactive dye, metallized dye, etc. may be used as the dye. It is preferable to use refined dyes from which inorganic salts have been removed.

Specified color index (C.I.) numbers of the dyes are, for example, C.I. direct black 17, 19, 32, 51, 71, 108, 146, 154, 166, C.I. acid black 2, 7, 24, 26, 31, 52, 63, 112, 118, C.I. basic black 2, C.I. direct blue 6, 22, 25, 71, 90, 106, C.I. acid blue 9, 22, 40, 59, 93, 102, 104, 113, 117, 120, 167, 229, 234, C.I. basic blue 1, 3, 5, 7, 9, 24, 25, 26, 28, 29, C.I. direct red 1, 4, 17, 28, 83, C.I. acid red 1, 6, 32, 37, 51, 52, 80, 85, 87, 92, 94, 115, 180, 256, 315, 317, C.I. basic red 1, 2, 9, 12, 13, 14, 37, C.I. direct yellow 12, 24, 26, 98, C.I. acid yellow 11, 17, 23, 25, 29, 42, 61, 71, C.I. basic yellow 11, 28, C.I. direct orange 34, 39, 44, 46, 60, C.I. direct violet 47, 48, C.I. direct brown 109, C.I. direct green 59, C.I. acid orange 7, 19, C.I. acid violet 49, C.I. basic violet 7, 14, 27, etc.

Urea, dimethylurea, etc. may also be added as additives.

It is preferable to filter the recording liquid of the present invention using filter with pore diameters of less than 3 $\mu$m, more preferably less than 1.0 $\mu$m, further preferably less than 0.45 $\mu$m.

Particles with large diameters may be removed by centrifugal separation before filtration by which blocking during filtration is reduced allowing filters to be used for longer periods.

Also, depending on the type of the recording apparatus, it is preferable to prepare the recording liquid as a liquid with viscosity in the range 0.8–15 cps (25° C.).

It is also preferable to adjust the value of the surface tension of the recording liquid to 25–60 dyne/cm. When the surface tension is less than 25 dyne/cm, it becomes difficult to obtain print recorded material with good clearness as the recording liquid permeates rapidly into plain paper leaving no time for film formation.

Also, for storage stability of the recording liquid, it is preferable that the average particle diameter of the recording liquid be 20–300 nm.

Although the recording liquid produced according to the present invention is an aqueous one, it may be suitably used as recording liquid for inkjet as its water resistance is extremely good and may be applied to fields such as to document preparations or marking in offices and, as light resistance surpasses that of dye types, for marking, numbering, or bar coding corrugated cardboard used outboard.

DESCRIPTION OF THE PREFERRED EMBODIMENTS

In the following, the present invention will be described in terms of the examples and comparative examples. In these, all designations of parts and percentages (%) indicate parts by weight and weight percentages (wt. %), respectively.

EXAMPLE 1

The following materials were fed into a stainless steel gallon kneader (Inoue Seisakusho) and ground for 3 hours. Next, the mixture was thrown into 2.5 liters of warm water and mixed with a high speed mixer for about an hour while heating up to about 80° C. and, after reaching a slurry state, filtered and washed 5 times using water to remove sodium chloride and the solvent to obtain an aqueous pigment dispersion with 50% solid content (product treated with salt milling).

| | |
|---|---|
| Reddish quinacridone pigment (Hoechst AG. Posterparmpink E) | 250 parts |
| Sodium chloride | 2500 parts |
| Diethylene glycol produced by Tokyo Kasei Co. | 200 parts |

Next, recording liquid concentrate for inkjet was produced by placing the following materials in a sand mill and dispersing for 3 hours.

| | |
|---|---|
| Aqueous pigment dispersion (product treated with salt milling, solid content 50%) | 30.0 parts |
| Dimethylamine ethanol | 0.1 parts |
| Non-ionic surfactant (Kao Corp., Ltd. "Emulgen 420") | 8.0 parts |
| Purified water | 55.7 parts |
| Glycerol | 6.0 parts |
| Antimold (Olin Chemical Co., Ltd. "Sodium omajin") | 0.2 parts |
| Total | 100 parts |

After mixing the following materials, recording liquid for water based inkjet was produced by filtering with an 1 μm membrane filter followed by filtering with a 0.45 μm membrane filter.

| | |
|---|---|
| Recording liquid concentrate | 16.7 parts |
| Colloidal silica (Nissan Chemical Industries, Ltd.. "Snowtex 30", average particle diameter is 10–20nm, solid content is 30%) | 16.7 parts |
| Dimethylethanolamine | 0.1 parts |
| Non-ionic surfactant (Kao Corp. "Emulgen 420") | 1.2 parts |
| Acrylic resin emulsion (Nippon Polymer Co., Ltd. "W-215", solid content is 30%) | 3.0 parts |
| Glycerol | 10.0 parts |
| Antimold (Olin Chemical Co., Ltd. "Sodium omajin") | 0.1 parts |
| Sodium salt of ethylenediaminetetraacetic acid | 0.1 parts |
| Purified water | 52.0 parts |
| Total | 100 parts |

EXAMPLE 2

After mixing the following materials, recording liquid for water based inkjet was produced by filtering with an 1 μm membrane filter followed by filtering with a 0.45 μm membrane filter.

| | |
|---|---|
| Recording liquid concentrate same as Embodiment 1 | 16.7 parts |
| Colloidal silica (Nissan Chemical Industries, Ltd.. "Snowtex 50", average particle diameter is 10–20nm, solid content is 50%) | 50.0 parts |
| Dimethylethanolamine | 0.1 parts |
| Non-ionic surfactant (Kao Corp. "Emulgen 420") | 1.2 parts |
| Acrylic resin emulsion (Nippon Polymer Co., Ltd., "W-215", solid content 30%) | 3.0 parts |
| Glycerol | 10.0 parts |
| Antimold (Olin Chemical Co., Ltd. "Sodium omajin") | 0.2 parts |
| Sodium salt of ethylenediaminetetraaceticacid | 0.1 parts |
| Purified water | 18.7 parts |
| Total | 100 parts |

EXAMPLE 3

After mixing the following materials, recording liquid for water based inkjet was produced by filtering with an 1 μm membrane filter followed by filtering with a 0.45 μm membrane filter.

| | |
|---|---|
| Recording liquid concentrate same as Embodiment 1 | 16.7 parts |
| Colloidal silica (Nissan Chemical Industries Ltd., "Snowtex 20", average particle diameter is 10–20nm, solid content 20%) | 0.1 parts |
| Dimethylethanolamine | 0.1 parts |
| Non-ionic surfactant (Kao Corp. "Emulgen 420") | 1.2 parts |
| Acrylic resin emulsion (Nippon Polymer Co., Ltd. "W-215", solid content 30%) | 3.0 parts |
| Glycerol | 10.0 parts |
| Antimold (Olin Chemical Co., Ltd. "Sodium omajin") | 0.2 parts |
| Sodium salt of ethylenediaminetetraacetic acid | 0.1 parts |
| Purified water | 68.6 parts |
| Total | 100 parts |

EXAMPLE 4

After mixing the following materials, recording liquid for water based inkjet was produced by filtering with an 1 μm membrane filter followed by filtering with a 0.45 μm membrane filter.

| | |
|---|---|
| Recording liquid concentrate same as Embodiment 1 | 16.7 parts |
| Colloidal silica | 12.5 parts |
| (Nissan Chemical Co., Ltd. "Snowtex XS", average particle diameter 5nm, solid content 20%) | |
| Dimethylethanolamine | 0.1 parts |
| Non-ionic surfactant | 1.2 parts |
| (Kao Corp. "Emulgen 420") | |
| Acrylic resin emulsion | 3.0 parts |
| (Nippon Polymer Co., Ltd. "W-215", solid content 30%) | |
| Glycerol | 10.0 parts |
| Antimold | 0.2 parts |
| (Olin Chemical Co., Ltd. "Sodium omajin") | |
| Sodium salt of ethylenediaminetetraacetic acid | 0.1 parts |
| Purified water | 56.2 parts |
| Total | 100 parts |

EXAMPLE 5

After mixing the following materials, recording liquid for water based inkjet was produced by filtering with a 1 μm membrane filter followed by filtering with a 0.45 μm membrane filter.

| | |
|---|---|
| Recording liquid concentrate same as Embodiment 1 | 16.7 parts |
| Colloidal silica | 6.3 parts |
| (Nissan Chemical Co., Ltd. "Snowtex YL", Average particle diameter is 50–80nm, solid content is 40%) | |
| Dimethylethanolamine | 0.1 parts |
| Non-ionic surfactant | 1.2 parts |
| (Kao Corp. "Emulgen 420") | |
| Acrylic resin emulsion | 3.0 parts |
| (Nippon Polymer Co., Ltd. "W-215", solid content is 30%) | |
| Glycerol | 10.0 parts |
| Antimold | 0.2 parts |
| (Olin Chemical Co., Ltd. "Sodium omajin") | |
| Sodium salt of ethylenediaminetetraacetic acid | 0.1 parts |
| Purified water | 62.4 parts |
| Total | 100 parts |

EXAMPLE 6

After mixing the following materials, recording liquid for water based inkjet was produced by filtering with an 1 μm membrane filter followed by filtering with a 0.45 μm membrane filter.

| | |
|---|---|
| Recording liquid concentrate same as Embodiment 1 | 16.7 parts |
| Colloidal silica | 16.7 parts |
| (Nissan Chemical Industries, Ltd.. "Snowtex 30", average particle diameter is 10–20nm, solid content is 30%) | |
| Dimethylethanolamine | 0.1 parts |
| Non-ionic surfactant | 0.6 parts |
| (Kao Corp. "Emulgen 420") | |
| Anionic surfactant | 0.6 parts |
| (Kao Corp. "Emurl 20C", solid content 25%) | |
| Acrylic resin emulsion | 3.0 parts |
| (Nippon Polymer Co., Ltd. "W-215", solid content 30%) | |
| Glycerol | 10.0 parts |
| Antimold | 0.2 parts |
| (Olin Chemical Co., Ltd. "Sodium omajin") | |
| Sodium salt of ethylenediaminetetraacetic acid | 0.1 parts |
| Purified water | 52.0 parts |
| Total | 100 parts |

EXAMPLE 7

After mixing the following materials, recording liquid for water based inkjet was produced by filtering with an 1 μm membrane filter followed by filtering with a 0.45 μm membrane filter.

| | |
|---|---|
| Recording liquid concentrate same as Embodiment 1 | 16.7 parts |
| Colloidal silica | 60.0 parts |
| (Nissan Chemical Industries, Ltd.. "Snowtex 50", average particle diameter is 10–20nm, solid content is 50%) | |
| Dimethylethanolamine | 0.1 parts |
| Non-ionic surfactant | 1.2 parts |
| (Kao Corp. "Emulgen 420") | |
| Acrylic resin emulsion | 3.0 parts |
| (Nippon Polymer Co., Ltd. "W-215", solid content 30%) | |
| Glycerol | 10.0 parts |
| Antimold | 0.2 parts |
| (Olin Chemical Co., Ltd. "Sodium omajin") | |
| Sodium salt of ethylenediaminetetraacetic acid | 0.1 parts |
| Purified water | 8.7 parts |
| Total | 100 parts |

EXAMPLE 8

After mixing the following materials, recording liquid for water based inkjet was produced by filtering with an 1 μm membrane filter followed by filtering with a 0.45 μm membrane filter.

| | |
|---|---|
| Recording liquid concentrate same as Embodiment 1 | 16.7 parts |
| Colloidal silica | 6.3 parts |
| (Nissan Chemical Industries, Ltd.. "Snowtex ZL", average particle diameter is 70–100nm, solid content is 40%) | |
| Dimethylethanolamine | 0.1 parts |
| Non-ionic surfactant | 1.2 parts |
| (Kao Corp. "Emulgen 420") | |
| Acrylic resin emulsion | 3.0 parts |
| (Nippon Polymer Co., Ltd. "W-215", solid content 30%) | |
| Glycerol | 10.0 parts |
| Antimold | 0.2 parts |
| (Olin Chemical Co., Ltd. "Sodium omajin") | |
| Sodium salt of ethylenediaminetetraacetic acid | 0.1 parts |
| Purified water | 62.4 parts |
| Total | 100 parts |

EXAMPLE 9

Recording liquid concentrate for inkjet was produced by placing the following materials in a sand mill and dispersing for 3 hours.

| | |
|---|---|
| Aqueous pigment dispersion same as Embodiment 1 | 30.0 parts |
| (product with salt milling treated, solid content 50%) | |
| Acrylic resin water solution | 5.8 parts |
| (Johnson Polymer Co., Ltd. "Johncryl 62", solid content 34.6%) | |
| Dimethylamine ethanol | 0.1 parts |
| Purified water | 57.9 parts |
| Glycerol | 6.0 parts |
| Antimold | 0.2 parts |
| (Olin Chemical Co., Ltd. "Sodium omajin") | |
| Total | 100 parts |

After mixing the following materials, recording liquid for water based inkjet was produced by filtering with an 1 μm membrane filter followed by filtering with a 0.45 μm membrane filter.

| | |
|---|---|
| Recording liquid concentrate | 16.7 parts |
| Colloidal silica | 16.7 parts |
| (Nissan Chemical Industries, Ltd. "Snowtex 30", average particle diameter is 10–20nm, solid content is 30%) | |
| Dimethylethanolamine | 0.1 parts |
| Acrylic resin emulsion | 3.0 parts |
| (Nippon Polymer Co., Ltd. "W-215", solid content 30%) | |
| Glycerol | 10.0 parts |
| Antimold | 0.2 parts |
| (Olin Chemical Co., Ltd. "Sodium omajin") | |
| Sodium salt of ethylenediaminetetraacetic acid | 0.1 parts |
| Purified water | 52.0 parts |
| Total | 100.0 parts |

EXAMPLE 10

Recording liquid concentrate for inkjet was produced by placing the following materials in a sand mill and dispersing for 6 hours.

| | |
|---|---|
| Reddish quinacridone pigment | 15.0 parts |
| (Hoechst AG. "Posterparm pink E") | |
| Dimethylamine ethanol | 0.1 parts |
| Non-ionic surfactant | 8.0 parts |
| (Kao Corp. "Emulgen 420") | |
| Purified water | 70.7 parts |
| Glycerol | 6.0 parts |
| Antimold | 0.2 parts |
| (Olin Chemical Co., Ltd. "Sodium omajin") | |
| Total | 100 parts |

After mixing the following materials, recording liquid for water based inkjet was produced by filtering with a 3 μm membrane filter followed by filtering with an 1 μm membrane filter.

| | |
|---|---|
| Recording liquid concentrate | 16.7 parts |
| Colloidal silica | 16.7 parts |
| (Nissan Chemical Industries, Ltd. "Snowtex 30", average particle diameter is 10–20nm, solid content is 30%) | |
| Dimethylethanolamine | 0.1 parts |
| Non-ionic surfactant | 1.2 parts |
| (Kao Corp., Ltd. "Emulgen 420") | |
| Acrylic resin emulsion | 3.0 parts |
| (Nippon Polymer Co., Ltd. "W-215", solid content 30%) | |
| Glycerol | 10.0 parts |
| Antimold | 0.2 parts |
| (Olin Chemical Co., Ltd. "Sodium omajin") | |
| Sodium salt of ethylenediaminetetraacetic acid | 0.1 parts |
| Purified water | 52.0 parts |
| Total | 100 parts |

COMPARATIVE EXAMPLE 1

After mixing the following materials, recording liquid for water based inkjet was produced by filtering with an 1 μm membrane filter followed by filtering with a 0.45 μm membrane filter.

| | |
|---|---|
| Recording liquid concentrate same as Embodiment 1 | 16.7 parts |
| Dimethylethanolamine | 0.1 parts |
| Non-ionic surfactant | 1.2 parts |
| (Kao Corp., Ltd. "Emulgen 420") | |
| Acrylic resin emulsion | 3.0 parts |
| (Nippon Polymer Co., Ltd. "W-215", solid content 30%) | |
| Glycerol | 10.0 parts |
| Antimold | 0.2 parts |
| (Olin Chemical Co., Ltd. "Sodium omajin") | |
| Sodium salt of ethylenediaminetetraacetic acid | 0.1 parts |
| Purified water | 68.7 parts |
| Total | 100 parts |

Viscosity, average particle diameter, surface tension, printing stability, storage stability and clearness, water resistance, and light resistance of the recorded material were evaluated for recording liquids obtained by the embodiments and the comparative example. The results are shown in Table 1. These evaluations were made as follows:

Viscosity was measured at 25° C. using a B type viscometer.

Average particle diameter was measured by laser diffraction particle size distribution meter (Shimadzu Corp. "SALD-1100")

Surface tension was measured at 25° C. using a FACE-CBVP type surface tension meter (Kyouwa Kaimenkagaku Co.).

Regarding printing stability, disorder, lack of dots of the print and occurrence or no occurrence of the recording liquid discharge were observed visually on prints made on plain paper (Xerox "K") by the discharge of recording liquid stored in inkjet cartridge (Seiko Epson Co., Ltd. "HG5130").

∘: Smooth discharge of recording liquid was observed from the character intended to be firstly printed and non-occurrence of discharge, print disorder and lack of the print of characters were not observed at all during continuous printing.

Δ: Smooth discharge of recording liquid was observed during character printing, but some lack of discharge was observed within the parts intended to be solidly shaded.

Regarding storage stability 30 cc of recording liquid was placed in a bottle with a screw mouth and after left standing for 1 month at 60° C., the presence of pigment sedimentation was evaluated visually. The viscosity of the recording liquid was also measured at 25° C. using a B type viscometer and compared with the viscosity before left standing.

∘: No pigment sedimentation was observed and the change in viscosity was small.

Δ: No pigment sedimentation was observed but the change in viscosity was large.

Regarding the clearness, the hue of recorded image on plain paper (Xerox Co., Ltd. "K") was measured with a color difference meter (Minolta Camera Co., Ltd. "CR-100") and calculation was made for the value of color saturation:

$$C^* = (a^{*2} + b^{*2})^{1/2}.$$

Regarding water resistance, recorded material portions on plain paper (Xerox Co., Ltd. "K") was dried and then soaked in water for 1 minute and the presence of blur and effusion of ink was evaluated visually.

∘: No blur or effusion of ink observed.

Δ: Blur and effusion of ink observed.

Regarding light resistance, recorded material portions on plain paper (Xerox Co., Ltd. "K") was exposed to the light emission from a Xenon lamp for 1 week and the change in hue was evaluated visually by comparing that with the one immediately after recording.

∘: No color fade confirmed.

Δ: Slight color fade confirmed.

TABLE 1

Results of evaluation of examples and comparative example

| Ex. No. | Viscosity(cps) | Average particle diameter(nm) | pH | Surface tension (dyne/cm) | Printing stability | Storage stability | Clearness | Water resistance | Light resistance |
|---|---|---|---|---|---|---|---|---|---|
| 1 | 3.0 | 100 | 9.5 | 41 | ○ | ○ | 51 | ○ | ○ |
| 2 | 3.5 | 120 | 9.5 | 43 | ○ | ○ | 53 | ○ | ○ |
| 3 | 3.0 | 100 | 9.5 | 40 | ○ | ○ | 43 | ○ | ○ |
| 4 | 3.0 | 100 | 9.5 | 41 | ○ | ○ | 52 | ○ | ○ |
| 5 | 3.6 | 130 | 9.5 | 42 | ○ | ○ | 50 | ○ | ○ |
| 6 | 3.0 | 90 | 9.5 | 36 | ○ | ○ | 51 | ○ | ○ |
| 7 | 5.0 | 160 | 9.5 | 42 | Δ | Δ | 57 | ○ | ○ |
| 8 | 3.5 | 150 | 9.5 | 42 | Δ | Δ | 50 | ○ | ○ |
| 9 | 6.0 | 170 | 9.5 | 46 | Δ | Δ | 58 | ○ | ○ |
| 10 | 5.0 | 500 | 9.5 | 42 | Δ | Δ | 56 | ○ | ○ |
| C 1 | 3.0 | 100 | 9.5 | 42 | ○ | ○ | 38 | ○ | Δ |

C.1: Comparative Example 1

Possible Applications in Industry

As described above, the present invention may be utilized as a recording liquid for water based inkjet which produces printing with good clearness and high quality and, also, print recorded material with sufficient water resistance and light resistance when used for print recording on plain paper such as acid paper, neutral paper, etc. generally used in offices, etc.

We claim:

1. Recording liquid for water based inkjet, comprising a pigment, colloidal silica, and a chelating agent.

2. Recording liquid for water based inkjet according to claim 1, wherein said chelating agent is at least one selected from the group consisting of propylenediaminetetraacetic acid, butylenediaminetetraacetic acid, pentylenediaminetetraacetic acid, cyclohexanediaminetetraacetic acid, diethylenetriaminepentaacetic acid, ethylenediaminediacetic acid, ethylenediaminemonoacetic acid, ethylenediaminetetraacetic acid, dioxaoctadiaminetetraacetic acid, hydroxyethylethylenediaminetriacetic acid, hydroxyethyliminodiacetic acid, iminodiacetic acid, nitrilotriacetic acid, triethylenetetraminehexaacetic acid, and their sodium or ammonium salts.

3. Recording liquid for water based inkjet according to claim 1, wherein said pigment is present in the range of 0.1–10 wt. % and said colloidal silica is present in the range of 0.5–30 wt. %.

4. Recording liquid for water based inkjet according to claim 1, wherein said chelating agent is present in the range of 0.1–5 wt. %.

5. Recording liquid for water based inkjet according to claim 1, wherein said colloidal silica has an average particle diameter of 5–100 nm.

6. Recording liquid for water based inkjet according to claim 1, wherein said pigment is at least one selected from the group consisting of quinacridone, phthalocyanine, azo, isoindolinone, quinophthalone, dianthraquinone red, diketopyrolopyrol, dioxazine, throne, perylene, and carbon black.

7. Recording liquid for water based inkjet according to claim 1, further comprising an anionic surfactant or a non-ionic surfactant.

8. Recording liquid for water based inkjet according to claim 7, wherein said anionic surfactant is at least one selected from the group consisting of fatty acid salt, alkylsulfuric ester, alkylarylsulfonate, alkylnaphthalenesulfonate, alkylsulfonate, dialkyl sulfosuccinate, alkyldiarylether disulfonate, alkylphosphate, polyoxyethylene alkylethersulfate, polyoxyethylenealkylaryl ethersulfate, naphthalenesulfonic acid formaldehyde, condensation, polyoxyethylenealkyl phosphate, glycerolborate fatty acid ester, and polyoxyethyleneglycerol fatty acid ester, and said non-ionic surfactant is at least one selected from the group consisting of polyoxyethylenealkylether, polyoxyethylenealkylarylether, polyoxyethyleneoxypropylene block copolymer, sorbitan fatty acid ester, polyoxyethylene sorbitan fatty acid ester, polyoxyethylene sorbitol fatty acid ester, glycerol fatty acid ester, polyoxyethylene fatty acid ester, and polyoxyethylenealkylamine.

9. Recording liquid for water based inkjet according to claim 1, wherein the pH is in the range of 6–10.

* * * * *